US010853688B2

(12) United States Patent
Iijima

(10) Patent No.: US 10,853,688 B2
(45) Date of Patent: Dec. 1, 2020

(54) RADIATION IMAGE CAPTURING SYSTEM

(71) Applicant: CANON KABUSHIKI KAISHA, Tokyo (JP)

(72) Inventor: Tadahiko Iijima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 16/051,946

(22) Filed: Aug. 1, 2018

(65) Prior Publication Data

US 2019/0042876 A1 Feb. 7, 2019

(30) Foreign Application Priority Data

Aug. 7, 2017 (JP) ................................. 2017-152484

(51) Int. Cl.
| | |
|---|---|
| *G06K 9/62* | (2006.01) |
| *G06T 7/00* | (2017.01) |
| *G01T 1/36* | (2006.01) |
| *G01T 1/17* | (2006.01) |
| *G01N 23/2252* | (2018.01) |
| *G03B 42/02* | (2006.01) |
| *G06N 3/08* | (2006.01) |

(52) U.S. Cl.
CPC .............. *G06K 9/6212* (2013.01); *G01T 1/17* (2013.01); *G01T 1/362* (2013.01); *G06T 7/001* (2013.01); *G01N 23/2252* (2013.01); *G03B 42/02* (2013.01); *G06N 3/08* (2013.01)

(58) Field of Classification Search
CPC ......... G06K 9/6212; G01T 1/17; G01T 1/362; G06T 7/001; G01N 23/2252; G03B 42/02; G06N 3/08; A61B 6/566; A61B 6/5294; A61B 6/542; G01H 30/20; H04N 5/32

See application file for complete search history.

(56) References Cited

U.S. PATENT DOCUMENTS

| | | | |
|---|---|---|---|
| 2005/0238138 A1* | 10/2005 | Imai ....................... | A61B 6/488 378/95 |
| 2013/0188856 A1 | 7/2013 | Adler, Jr. | |
| 2016/0025865 A1* | 1/2016 | Wayama ................ | A61B 6/542 250/370.07 |
| 2018/0182102 A1* | 6/2018 | Jerebko ................... | G06T 7/11 |

FOREIGN PATENT DOCUMENTS

| | | |
|---|---|---|
| CN | 103269752 A | 8/2013 |
| CN | 105989092 A | 10/2016 |
| JP | 2011-177348 A | 9/2011 |
| WO | 2015/025955 A1 | 2/2015 |

* cited by examiner

*Primary Examiner* — Leon Viet Q Nguyen
(74) *Attorney, Agent, or Firm* — Canon U.S.A., Inc. IP Division

(57) ABSTRACT

A radiation image capturing system includes a plurality of radiation image capturing apparatuses that each performs an image capturing operation to capture a radiation image based on radiation emitted from a radiation generating apparatus and transmitted through an object, a control apparatus that communicates with the plurality of radiation image capturing apparatuses, a calculation unit that calculates information about similarity between the radiation image and a reference image, and an image acquisition unit that acquires the radiation image from the radiation image capturing apparatus selected from the plurality of radiation image capturing apparatuses based on the information about similarity.

14 Claims, 9 Drawing Sheets

RADIATION IMAGE CAPTURING SYSTEM

BACKGROUND

Field

The present disclosure relates to a radiation image capturing system using a radiation image capturing apparatus that detects radiation.

Description of the Related Art

Radiation image capturing apparatuses for generating digital radiation images based on emitted radiation have become widespread in recent years, and the spread thereof has accelerated digitization of radiation image capturing systems. The digitization of radiation image capturing systems has enabled radiation images to be checked immediately after the radiation images are captured. This has markedly improved a workflow and enabled radiation images to be captured at a shorter cycle than those captured by an image capturing method using a conventional film or a conventional computed radiography (CR) apparatus.

Such a radiation image capturing system includes a radiation image capturing apparatus and an image capturing control apparatus that receives a radiation image from the radiation image capturing apparatus to use the radiation image. The radiation image acquired by the radiation image capturing apparatus is transmitted as an image to the image capturing control apparatus. A user can select one radiation image capturing apparatus from a plurality of radiation image capturing apparatuses to execute radiation image capturing. In such a case, the image capturing control apparatus needs to be notified of from which radiation image capturing apparatus an image is to be acquired. The image capturing control apparatus communicates with the notified radiation image capturing apparatus to acquire an image. If the user uses a radiation image capturing apparatus different from the notified radiation image capturing apparatus, the image capturing control apparatus cannot acquire a radiation image.

In a radiation image capturing system discussed in Japanese Patent Application Laid-Open No. 2011-177348, a plurality of radiation image capturing apparatuses can capture radiation images, and an image capturing control apparatus acquires the radiation images from all of the radiation image capturing apparatuses. Then, the image capturing control apparatus selects a significant radiation image from the acquired radiation images and uses the significant radiation image.

According to the radiation image capturing system discussed in Japanese Patent Application Laid-Open No. 2011-177348, however, the image capturing control apparatus may select an image from an inappropriate radiation image capturing apparatus.

SUMMARY

The present disclosure is directed to a radiation image capturing apparatus that improves accuracy in selecting a significant radiation image from images captured by a plurality of radiation image capturing apparatuses that capture images.

According to an aspect of the present disclosure, a radiation image capturing system includes a plurality of radiation image capturing apparatuses configured to perform an image capturing operation to capture a radiation image based on radiation emitted from a radiation generating apparatus and transmitted through an object, a control apparatus configured to communicate with the plurality of radiation image capturing apparatuses, a calculation unit configured to calculate information about similarity between the radiation image and a reference image, and an image acquisition unit configured to acquire the radiation image from the radiation image capturing apparatus selected from the plurality of radiation image capturing apparatuses based on the information about similarity.

Further features will become apparent from the following description of exemplary embodiments with reference to the attached drawings.

DESCRIPTION OF THE EMBODIMENTS

Exemplary embodiments are hereinafter described in detail with reference to the drawings. The following exemplary embodiments are not intended to limit the scope of the claims, and not all of the combinations of the aspects that are described according to the following embodiments are necessarily required with respect to a problem to be solved by the present disclosure. Radiation in each of the exemplary embodiments can include an alpha ray, a beta ray, and a gamma ray, each of which is a beam formed of particles (including a photon) released by radioactive decay. The radiation can also include a beam, such as an X ray, a corpuscular ray, and a cosmic ray, having energy substantially greater than or equal to that of the beam, such as the alpha ray, the beta ray, and the gamma ray.

Figure 1:
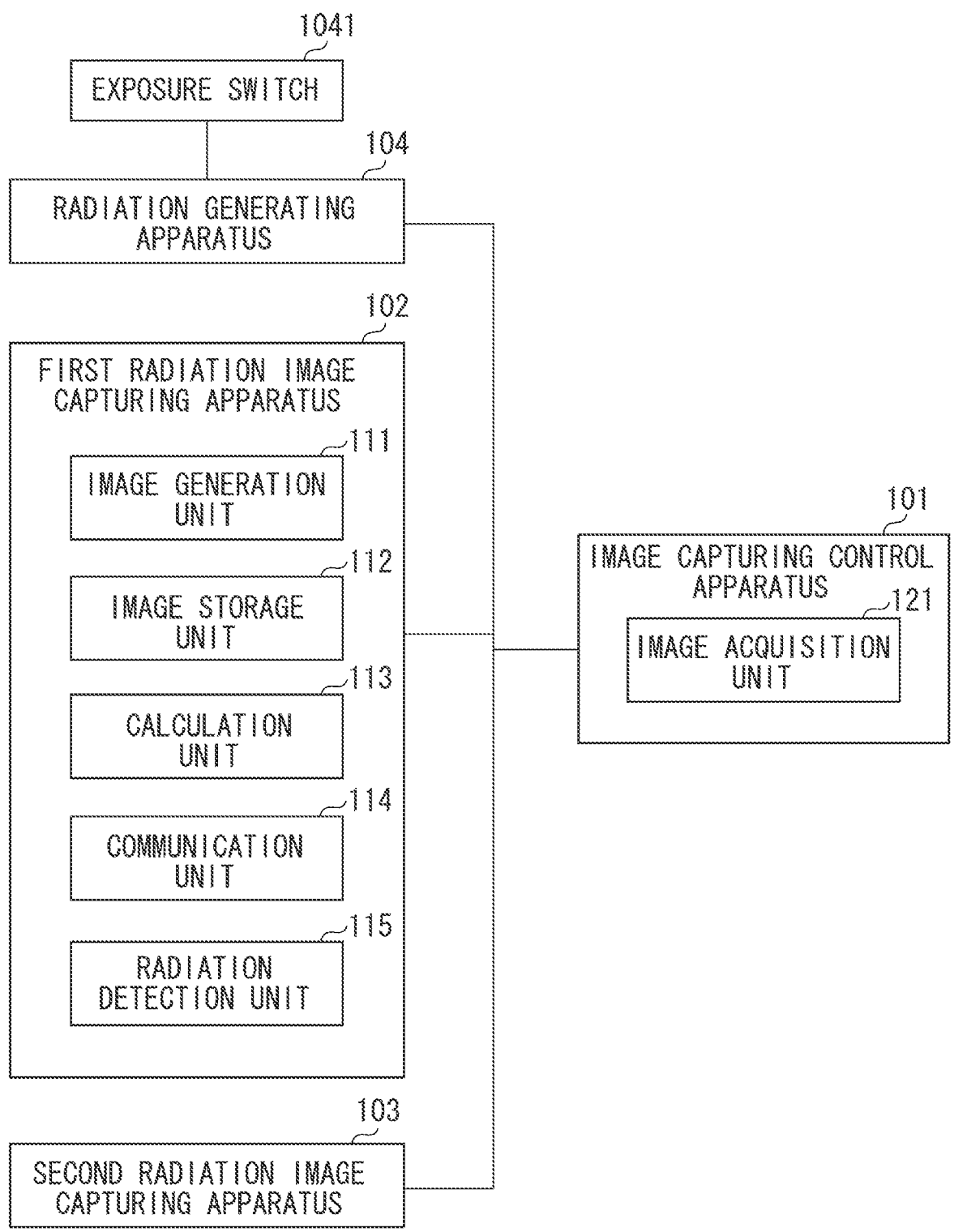
FIG. 1 is a block diagram illustrating a radiation image capturing system according to a first exemplary embodiment.

FIG. 1 is a diagram illustrating a radiation image capturing system according to a first exemplary embodiment. The radiation image capturing system of the present exemplary embodiment includes a radiation generating apparatus 104, a plurality of radiation image capturing apparatuses, and an image capturing control apparatus. The plurality of radiation image capturing apparatuses each generates an image based on radiation emitted from the radiation generating apparatus 104. The image capturing control apparatus communicates with the plurality of radiation image capturing apparatuses. In the present exemplary embodiment, an image capturing control apparatus 101 is described as an example of the control apparatus, and a first radiation image capturing apparatus 102 and a second radiation image capturing apparatus 103 are described as examples of the plurality of radiation image capturing apparatuses. The radiation generating apparatus 104 transmits an irradiation start notification to all of the usable radiation image capturing apparatuses in response to a press of an exposure switch 1041. Upon receipt of the irradiation start notification, each of the usable radiation image capturing apparatuses start an image capturing operation (accumulation of electric charge), and transmit an irradiation permission notification to the radiation generating apparatus 104. Upon receipt of the irradiation permission notification from all of the usable radiation image capturing apparatuses (the first radiation image capturing apparatus 102 and the second radiation image capturing apparatus 103 in the present exemplary embodiment), the radiation generating apparatus 104 executes emission of radiation. This operation synchronizes the radiation generating apparatus 104 with the first radiation image capturing apparatus 102 and the second radiation image capturing apparatus 103. The image capturing control apparatus 101 communicates with the first radiation image capturing apparatus 102 and the second radiation image capturing apparatus 103 that are connected to the image capturing control apparatus 101 to control radiation image capturing. The image capturing control apparatus 101 communicates with the radiation generating apparatus 104 to acquire information at the time of emission of the radiation from the radiation generating apparatus 104. This enables each of the first radiation image capturing apparatus 102 and the second radiation image capturing apparatus 103 to perform an image capturing operation for capturing a radiation image based on radiation emitted from the radiation generating apparatus 104 and transmitted through an object. The number of radiation image capturing apparatuses is not limited to two and can be three or more. The present exemplary embodiment is described using a configuration in which two radiation image capturing apparatuses are provided as an example.

Each of the first radiation image capturing apparatus 102 and the second radiation image capturing apparatus 103 of the present exemplary embodiment includes an image generation unit 111, an image storage unit 112, a calculation unit 113, a communication unit 114, and a radiation detection unit 115. In FIG. 1, while these units are just illustrated in the first radiation image capturing apparatus 102 as an example, the second radiation image capturing apparatus 103 can include a similar configuration to that of the first radiation image capturing apparatus 102. The image capturing control apparatus 101 of the present exemplary embodiment includes an image acquisition unit 121.

The image generation unit 111 generates a radiation image based on the radiation emitted from the radiation generating apparatus and transmitted through an object. Generation of the radiation image is described in detail below with reference to FIG. 2. The image storage unit 112 stores the image generated by the image generation unit 111. The calculation unit 113 calculates information about similarity between the radiation image and a reference image. This calculation is described in detail below. The communication unit 114 performs communication between the radiation image capturing apparatus 102 and the image capturing control apparatus 101. The radiation detection unit 115 detects the beginning of irradiation of the image generation unit 111 with radiation, the end of the irradiation, and an amount of irradiation. Based on the information about similarity calculated by the calculation unit 113, the image acquisition unit 121 acquires a radiation image from the radiation image capturing apparatus 102 selected from the plurality of radiation image capturing apparatuses.

Figure 2:
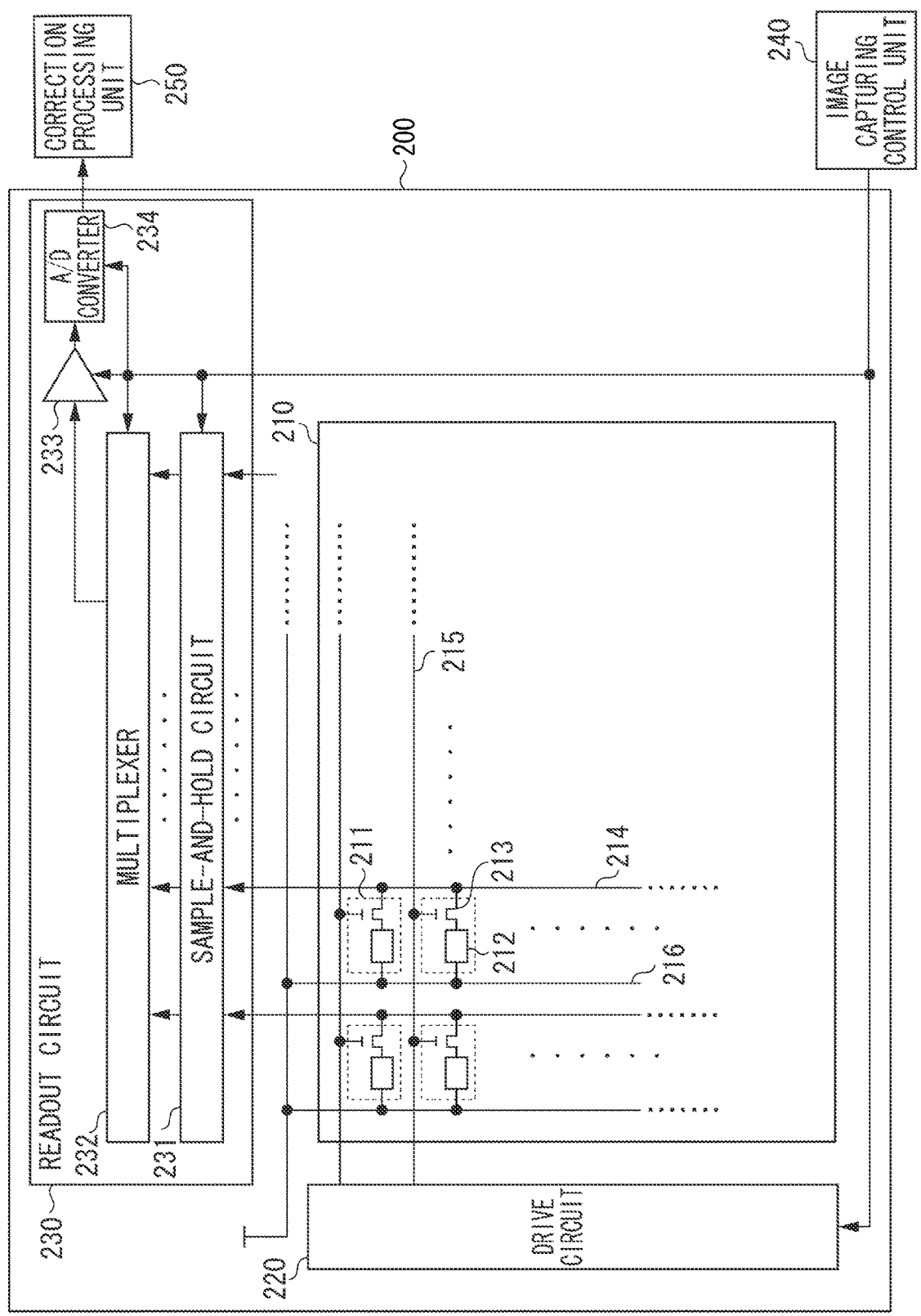
FIG. 2 is a concept diagram illustrating a radiation image capturing apparatus.

Herein, a configuration example of an image generation unit 200 (corresponding to the image generation unit 111 illustrated in FIG. 1) is described with reference to FIG. 2. The image generation unit 200 includes a sensor unit 210, a drive circuit 220, and a readout circuit 230. The sensor unit 210 includes a plurality of pixels 211 that are arranged in a two-dimensional array to include a plurality of rows and a plurality of columns. Each of the plurality of pixels 211 includes a conversion element 212 and a switch element 213. The conversion element 212 converts incident radiation into an electric charge, and accumulates the electric charge. The conversion element 212 can include a scintillator that converts radiation into visible light, and a photoelectric conversion element that converts the visible light into an electric charge. Alternatively, the conversion element 212 can directly convert radiation into an electric charge. The switch element 213 transfers the electric charge accumulated in the conversion element 212 to a signal line 214. The switch element 213 includes a transistor, such as a thin-film transistor (TFT). The switch element 213 includes a control terminal. The switch element 213 is turned on and is shifted to a conductive state if an on-voltage is supplied to the control terminal. The switch element 213 is turned off and is shifted to a non-conductive state if an off-voltage is supplied to the control terminal.

One terminal of the conversion element 212 receives a bias voltage from a power source unit 600 via a bias line 216. The other terminal of the conversion element 212 is connected to the signal line 214 via the switch element 213. The control terminal of the switch element 213 is connected to a drive line 215. The sensor unit 210 includes a plurality of drive lines 215 each extending in a row direction (a horizontal direction in FIG. 3). The plurality of drive lines 215 is arranged in a column direction (a vertical direction in FIG. 3). The control terminals of the switch elements 213 of the respective pixels 211 in the same row are commonly connected to each of the drive lines 215. The sensor unit 210 includes a plurality of signal lines 214 each extending in the column direction. The plurality of signal lines 214 is arranged in the row direction. One of main terminals of the switch elements 213 of the respective pixels 211 in the same column are commonly connected to each of the signal lines 214.

The drive circuit 220 drives the sensor unit 210 based on a control signal supplied from an image capturing control unit 240. In particular, the drive circuit 220 supplies a drive signal to the control terminal of each of the switch elements 213 via the drive line 215. The drive circuit 220 sets a drive signal to an on-voltage, thereby turning on the switch element 213. The drive circuit 220 sets a drive signal to an off-voltage, thereby turning off the switch element 213. If the switch element 213 is turned on, the electric charge accumulated in the conversion element 212 is transferred to the signal line 214.

The readout circuit 230 reads an electric charge from the sensor unit 210 based on a control signal supplied from the image capturing control unit 240, and generates a signal corresponding to the electric charge. Then, the readout circuit 230 supplies the signal to a correction processing unit 250. The readout circuit 230 includes a sample-and-hold circuit 231, a multiplexer 232, an amplifier 233, and an analog-to-digital (A/D) converter 234. The sample-and-hold circuit 231 holds the electric charges read from the conversion elements 212 on a pixel row basis. The multiplexer 232 extracts the electric charges of one pixel row in order from the sample-and-hold circuit 231, and supplies analog signals generated based on the extracted electric charges to the amplifier 233. The amplifier 233 amplifies the supplied analog signals, and supplies the resultant analog signals to the A/D converter 234. The A/D converter 234 converts the supplied analog signals into digital signals (corresponding to the aforementioned radiation image data), and supplies the digital signals to the correction processing unit 250.

The correction processing unit 250 performs a dark correction on image data converted into digital values. In the dark correction, dark image data obtained from only a dark electric charge component without emission of radiation is subtracted from the radiation image data, thereby acquiring a radiation image with an unnecessary dark electric charge component removed. The dark image refers to an image captured by an image capturing operation without irradiation of the radiation image capturing apparatus with radiation, and is one example of an image captured by an image capturing operation not based on radiation that has been transmitted through an object. The correction processing unit 250 can perform a sensitivity correction (a gain correction) on the radiation image data using a sensitivity correction image (a gain image). The gain image refers to an image captured by an image capturing operation in which an object is not disposed between the radiation generating apparatus 104 and the radiation image capturing apparatus, and the radiation image capturing apparatus is irradiated with radiation that has not been transmitted through the object. More specifically, the gain image is also one example of an image captured by an image capturing operation not based on radiation that has been transmitted through an object.

Next, an operation from preparation of image capturing to transmission of a captured image is described with reference to a flowchart illustrated in FIG. 3.

In step S101, each of the radiation image capturing apparatuses performs dark image capturing and gain image capturing in advance, and stores a dark image and a gain image therein. The dark image capturing refers to image capturing performed without irradiation of the radiation image capturing apparatus with radiation. The dark image mainly includes small pixel values. The gain image capturing refers to image capturing in which the entire radiation image capturing apparatus is irradiated with radiation and an object is not disposed between the radiation image capturing apparatus and the radiation generating apparatus 104. The gain image is used for performing a gain correction on each pixel, and mainly includes large pixel values.

In step S102, an object is disposed between the radiation image capturing apparatuses and the radiation generating apparatus 104, and the plurality of radiation image capturing apparatuses each accumulates an electric charge to capture an image.

In step S103, information about similarity between the radiation image captured by each of the radiation image capturing apparatuses in step S102 and the reference image, which is at least one of the dark image and the gain image prepared in step S101, is calculated. Based on the calculated information about similarity, a radiation image capturing apparatus that has generated a significant image is identified.

In step S104, the radiation image capturing apparatus identified in step S103 transmits the image to the image capturing control apparatus 101.

Figure 3:
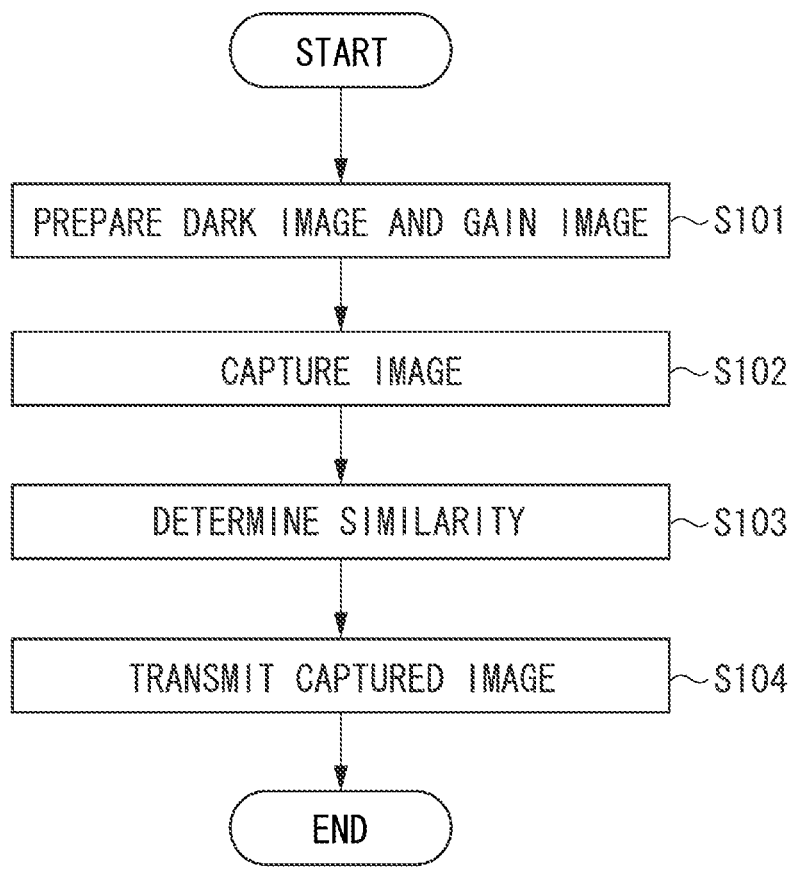
FIG. 3 is a flowchart illustrating a radiation image capturing operation according to the first exemplary embodiment.
Figure 4:
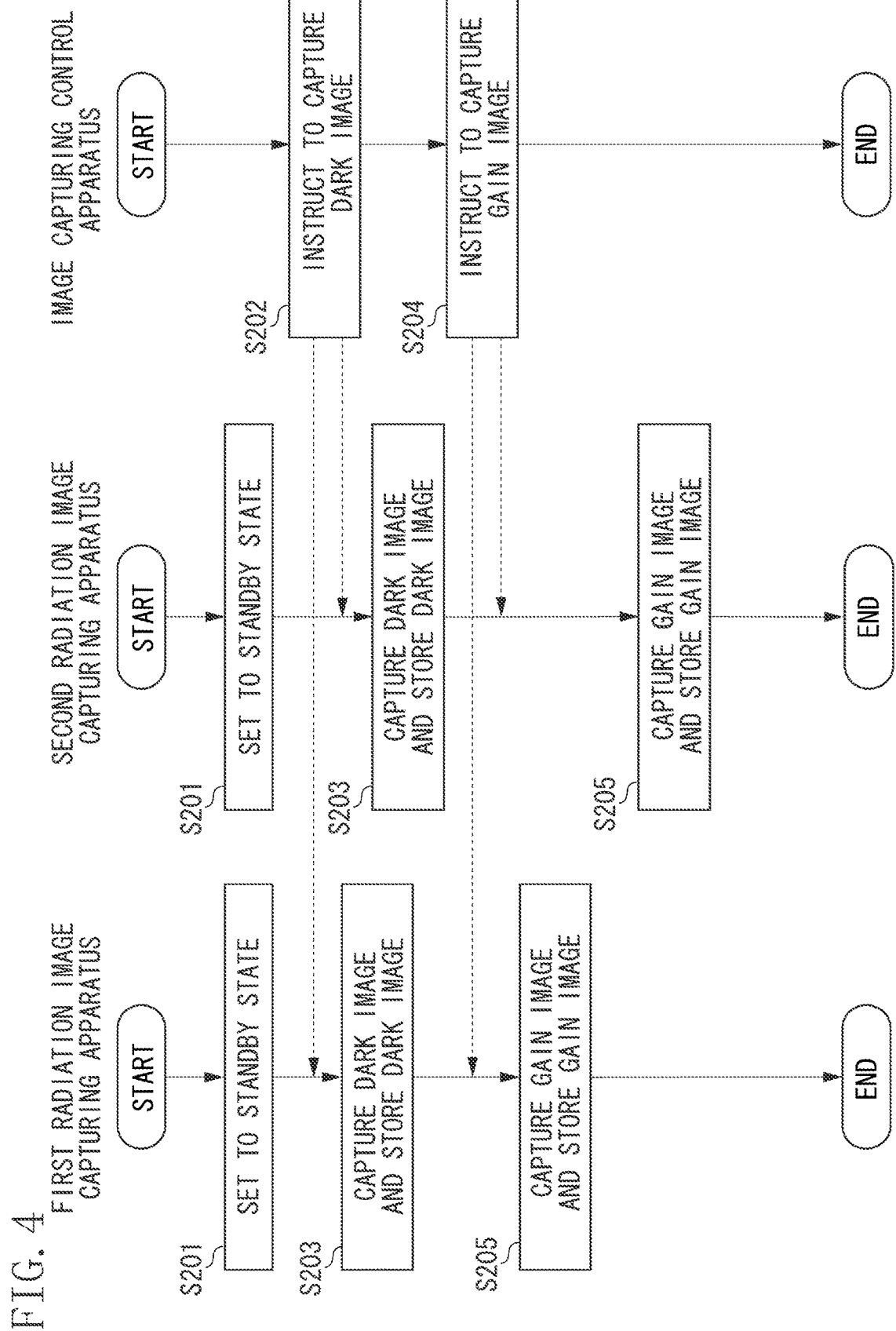
FIG. 4 is a flowchart illustrating a radiation image capturing operation according to the first exemplary embodiment.

FIG. 4 is a flowchart illustrating an operation performed in the radiation image capturing preparation (in step S101 illustrated in FIG. 3) by the first radiation image capturing apparatus 102 and the second radiation image capturing apparatus 103.

In step S201, each of the first radiation image capturing apparatus 102 and the second radiation image capturing apparatus 103 is set to a standby state. In the standby state, communication between each of the radiation image capturing apparatuses and the image capturing control apparatus 101 is established.

In step S202, the image capturing control apparatus 101 instructs each of the first radiation image capturing apparatus 102 and the second radiation image capturing apparatus 103 to capture a dark image.

In step S203, each of the first radiation image capturing apparatus 102 and the second radiation image capturing apparatus 103 captures a dark image, and stores the generated dark image therein.

In step S204, the image capturing control apparatus 101 instructs each of the first radiation image capturing apparatus 102 and the second radiation image capturing apparatus 103 to capture a gain image.

In step S205, each of the first radiation image capturing apparatus 102 and the second radiation image capturing apparatus 103 communicates with the radiation generating apparatus 104 to capture a gain image, and stores the generated gain image therein.

It is not necessary to perform the processing from step S201 to step S205 immediately before an image of an object is captured as long as the processing is performed before an image of an object is captured. Moreover, the description has been given of a case in which each of the dark image capturing and the gain image capturing is performed according to an instruction from the image capturing control apparatus 101. However, the image capturing can also be performed autonomously by each of the radiation image capturing apparatuses instead of being performed according to the instruction from the image capturing control apparatus 101. Moreover, the description has been given of a case in which the radiation image capturing apparatuses communicate with the radiation generating apparatus 104 at the time of gain image capturing. However, the radiation image capturing apparatus can also use a function of the radiation detection unit 115 to perform gain image capturing without communicating with the radiation generating apparatus 104.

Figure 5:
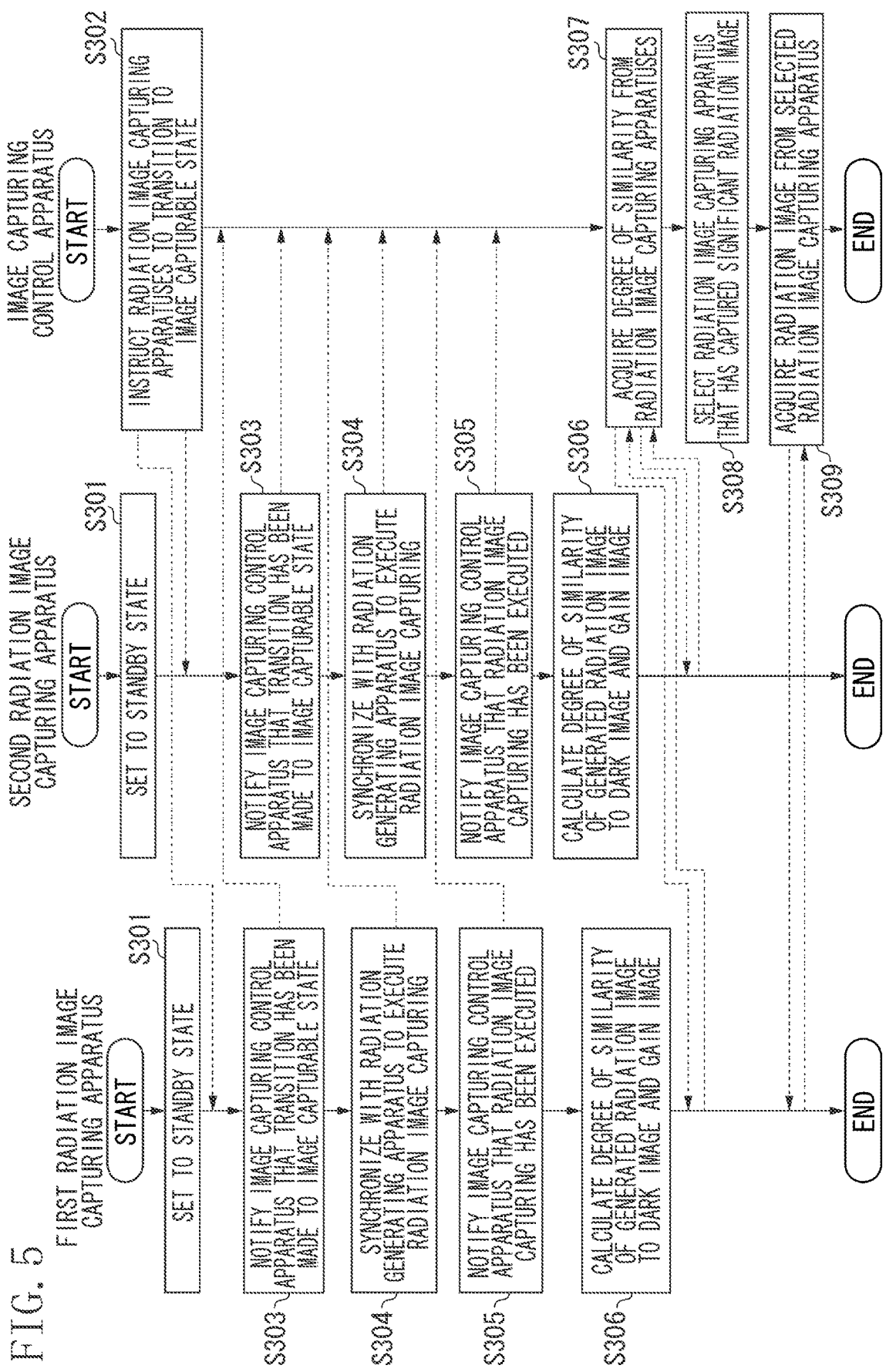
FIG. 5 is a flowchart illustrating a radiation image capturing operation according to the first exemplary embodiment.

FIG. 5 is a flowchart illustrating an operation performed from completion of the image capturing preparation to execution of image capturing (steps S102, S103, and S104 of the flowchart illustrated in FIG. 3) by the first radiation image capturing apparatus 102 and the second radiation image capturing apparatus 103.

In step S301, each of the first radiation image capturing apparatus 102 and the second radiation image capturing apparatus 103 is set to a standby state. In the standby state, communication between each of the radiation image capturing apparatuses and the image capturing control apparatus 101 is established.

In step S302, the image capturing control apparatus 101 transmits a transition instruction for transition to an image capturable state to each of the first radiation image capturing apparatus 102 and the second radiation image capturing apparatus 103.

In step S303, each of the first radiation image capturing apparatus 102 and the second radiation image capturing apparatus 103 transitions to the image capturable state in response to the transition instruction from the image capturing control apparatus 101, and notifies the image capturing control apparatus 101 that the transition has been made to the image capturable state.

In step S304, each of the first radiation image capturing apparatus 102 and the second radiation image capturing apparatus 103 executes radiation image capturing in synchronization with the radiation generating apparatus 104.

In step S305, each of the first radiation image capturing apparatus 102 and the second radiation image capturing apparatus 103 notifies the image capturing control apparatus 101 that the radiation image capturing has been executed.

In step S306, each of the first radiation image capturing apparatus 102 and the second radiation image capturing apparatus 103 calculates information about similarity indicating how similar the generated radiation image is to the dark image and the gain image.

In step S307, the image capturing control apparatus 101 acquires the information about similarity calculated in step S306 from each of the first radiation image capturing apparatus 102 and the second radiation image capturing apparatus 103.

In step S308, the image acquisition unit 121 of the image capturing control apparatus 101 compares the information about similarity acquired in step S307. The image acquisition unit 121 determines an image having the least similarity between the radiation image and a reference image, which is at least one of the dark image and the gain image, as a significant image, and identifies and selects a radiation image capturing apparatus that generated the image having the least similarity. Since generation of the dark image and the gain image is not based on radiation transmitted through an object, fluctuation of pixel values is not as much as that of a shadow of the object. Since generation of the radiation image is based on the radiation transmitted through an object, there are large fluctuation of pixel values caused by the shadow of the object. If the acquired radiation image is similar to at least one of the dark image and the gain image, such a radiation image is unlikely to have been generated based on the radiation transmitted through the object. If the acquired radiation image is not similar to at least one of the dark image and the gain image, such a radiation image is likely to have been generated based on the radiation transmitted through the object. Accordingly, the image acquisition unit 121 can determine the radiation image in which the object appears as a significant image based on the information about similarity. In the present exemplary embodiment, at least one of the dark image and the gain image is used as the reference image. However, the present exemplary embodiment is not limited thereto. A sample image can be prepared beforehand for each image capturing region as a reference image, and determination can be made based on information about similarity between the sample image and a radiation image. In such a case, an image having the highest similarity can be determined as a significant image.

In step S309, the image capturing control apparatus 101 acquires the radiation image from the radiation image capturing apparatus (the first radiation image capturing apparatus 102) selected in step S308. More specifically, the image capturing control apparatus 101 requests for the image from the first radiation image capturing apparatus 102, and the communication unit 114 of the first radiation image capturing apparatus 102 transmits the radiation image to the image capturing control apparatus 101 in response to the request for the image from the image capturing control apparatus 101.

Based on the above-described processing, the image capturing control apparatus 101 does not have to acquire all the radiation images from each of the radiation image capturing apparatuses, and can select a significant radiation image using the information about similarity, which has a smaller data size than that of the radiation image.

Figure 6:
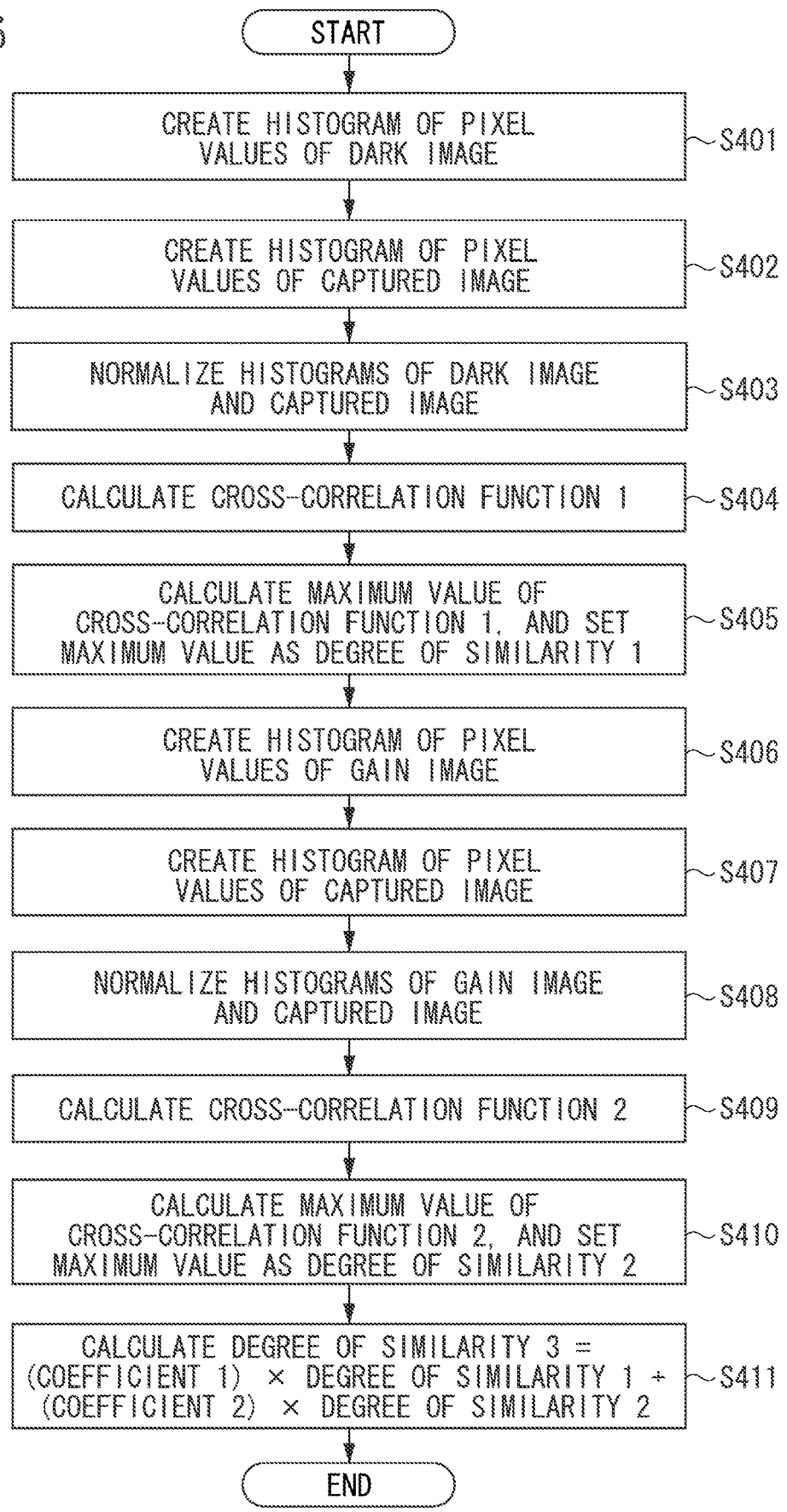
FIG. 6 is a flowchart illustrating calculation of information about similarity according to the first exemplary embodiment.

FIG. 6 is a flowchart illustrating an operation to calculate the information about similarity performed by each of the radiation image capturing apparatuses in step S306 of the flowchart illustrated in FIG. 5.

In step S401, the calculation unit 113 creates a histogram of pixel values of a dark image as a statistic.

In step S402, the calculation unit 113 creates a histogram of pixel values of a captured radiation image of an object.

In step S403, the calculation unit 113 normalizes the histograms respectively created in steps S401 and S402 so that the histograms can be compared.

In step S404, the calculation unit 113 creates an approximation expression of the two histograms normalized in step S403 to calculate a cross-correlation function 1.

In step S405, the calculation unit 113 calculates a maximum value of the cross-correlation function 1 calculated in step S404, and sets the maximum value as a degree of similarity 1.

In step S406, the calculation unit 113 creates a histogram of pixel values of a gain image as a statistic.

In step S407, the calculation unit 113 creates a histogram of pixel values of a captured radiation image of the object. If the histogram created in step S402 is used, the processing in step S407 can be omitted. In such a case, the processing in step S407 described below can be replaced with the processing in step S402.

In step S408, the calculation unit 113 normalizes the histograms respectively created in steps S406 and S407 so that the histograms can be compared.

In step S409, the calculation unit 113 creates an approximation expression of the two histograms normalized in step S408 to calculate a cross-correlation function 2.

In step S410, the calculation unit 113 calculates a maximum value of the cross-correlation function 2 calculated in step S409, and sets the maximum value as a degree of similarity 2.

In step S411, the calculation unit 113 calculates a degree of similarity 3 as the information about similarity by adding values obtained by multiplying the degrees of similarity determined in respective steps S405 and S410 by respective coefficients.

The present exemplary embodiment is not limited to the procedure from steps S401 to S410. The sequence of processing can be changed as long as the degree of similarity 3 can be determined. Histograms of the dark image and the gain image as well as the approximation expression of the histograms can be created in advance. In such a case, the approximation expression of the histograms created in advance can be used in determining the degree of similarity. Another parameter can be added to a formula for determining the degree of similarity. The present exemplary embodiment has been described using the maximum value of the cross-correlation function as the degree of similarity. However, a correlation value can be used as a degree of similarity as well. Alternatively, a degree of similarity can be determined using a value such as a median value, a maximum value, a minimum value, a mean value, a dispersion, or a standard deviation of each of the histograms. The present exemplary embodiment has been described using the histogram as a statistic, but is not limited thereto. Various statistics can be applied.

A functional configuration of a radiation image capturing system according to a second exemplary embodiment is similar to that of the first exemplary embodiment (FIG. 1). However, a calculation unit 113 of the second exemplary embodiment includes a neural network. Since the calculation unit 113 includes the neural network, the calculation unit 113 needs to perform learning in advance to determine information about similarity.

Figure 7:
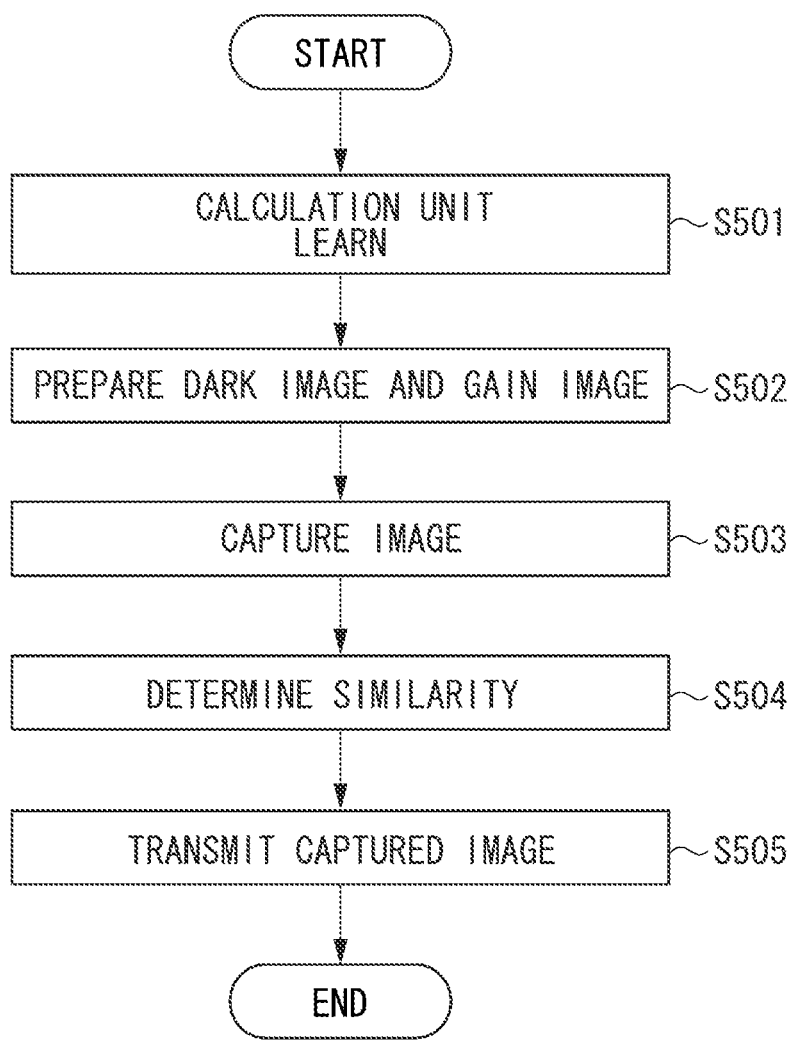
FIG. 7 is a flowchart illustrating a radiation image capturing operation according to a second exemplary embodiment.

FIG. 7 is a flowchart illustrating an operation from preparation of image capturing to transmission of a captured image according to the second exemplary embodiment.

In step S501, data of a plurality of histograms is input to the calculation unit 113, and the calculation unit 113 learns to adjust a parameter of the neural network such that an output result is close to a teaching signal.

The calculation unit 113 can also use, for example, a neural network that previously performed learning. A component of the calculation unit 113 is not limited to the neural network as long as the calculation unit 113 can output information about similarity upon receipt of specific data. Data to be input to the calculation unit 113 is not limited to the histogram. For example, image data, an approximation expression of the histogram, or a value such as a median value, a maximum value, a minimum value, a mean value, a dispersion, or a standard deviation of the histogram can be input.

In step S502, each of radiation image capturing apparatuses performs dark image capturing and gain image capturing in advance, and stores a dark image and a gain image therein.

In step S503, an object is disposed between the radiation image capturing apparatuses and a radiation generating apparatus 104, and the plurality of radiation image capturing apparatuses each accumulates an electric charge to capture an image.

In step S504, the calculation unit 113 of each of the radiation image capturing apparatuses calculates information about similarity between the image captured by each of the radiation image capturing apparatuses and the dark image and the gain image prepared in step S502. Based on the calculated information about similarity, an image acquisition unit 121 identifies a radiation image capturing apparatus that has generated a significant image.

In step S505, the identified radiation image capturing apparatus transmits the image to the image capturing control apparatus 101.

Figure 8:
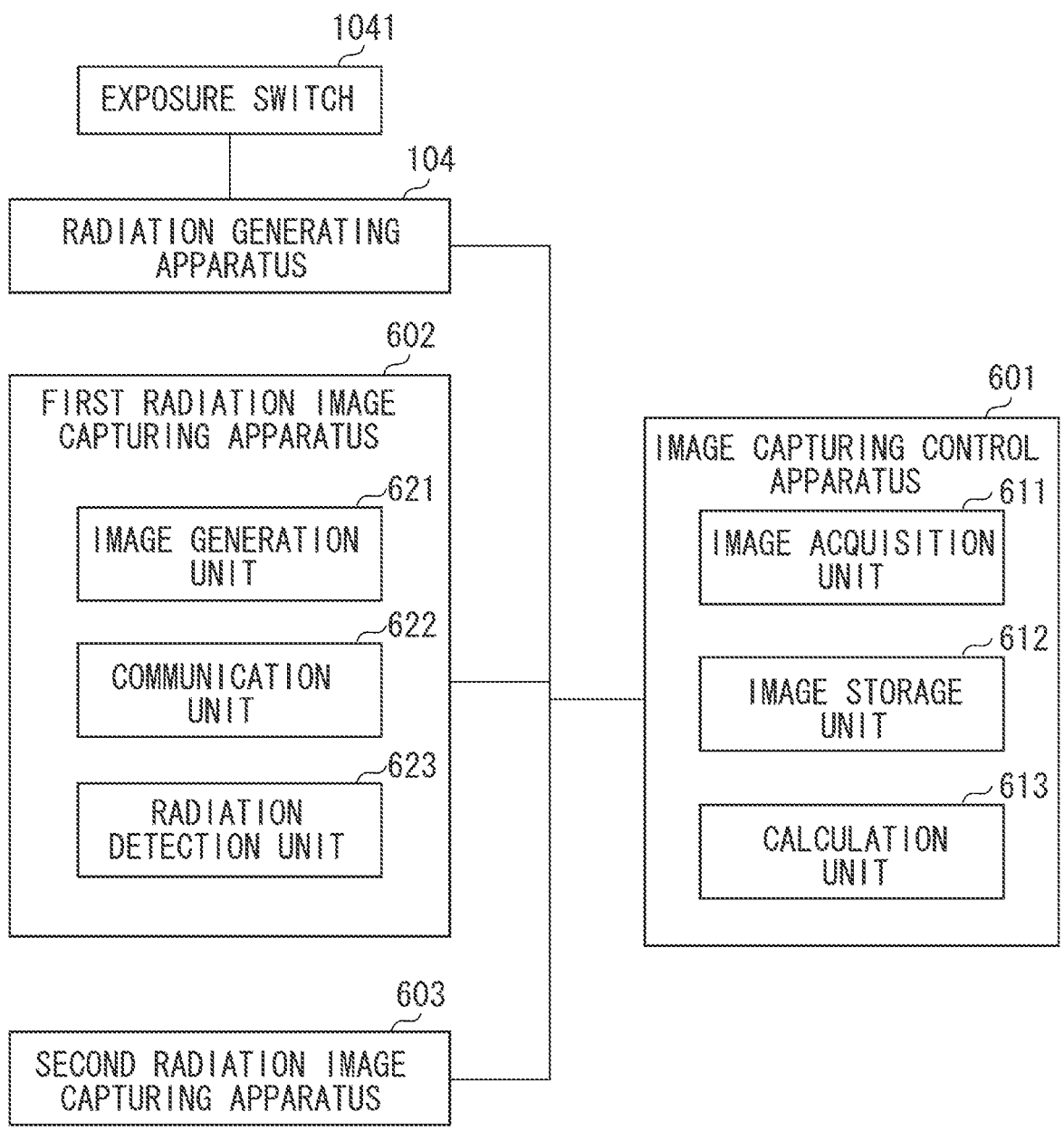
FIG. 8 is a block diagram illustrating a radiation image capturing system according to a third exemplary embodiment.

In a radiation image capturing system according to a third exemplary embodiment illustrated in FIG. 8, an image capturing control apparatus calculates information about similarity.

Each of radiation image capturing apparatuses 602 and 603 of the third exemplary embodiment includes an image generation unit 621, a communication unit 622, and a radiation detection unit 623. The image generation unit 621 is similar to the image generation unit 111 of the first exemplary embodiment, and the radiation detection unit 623 is similar to the radiation detection unit 115 of the first exemplary embodiment. The communication unit 622 includes a function of transmitting image capturing information to an image capturing control apparatus 601. The image capturing information has a smaller data size than that of a radiation image and includes a characteristic of the radiation image. The image capturing control apparatus 601 includes an image acquisition unit 611, an image storage unit 612, and a calculation unit 613.

An operational flow is similar to that of the first exemplary embodiment (FIG. 3).

In step S101, each of the radiation image capturing apparatuses transmits a dark image and a gain image acquired in advance to the image capturing control apparatus 601 to store the dark image and the gain image in the image storage unit 612. The dark image and the gain image are respectively acquired by dark image capturing and gain image capturing performed in advance by each of the radiation image capturing apparatuses.

In step S102, each of the radiation image capturing apparatuses captures an image of an object, and the communication unit 622 transmits data having a smaller size than radiation image data and including a characteristic of the radiation image data as image capturing information to the image capturing control apparatus 601.

In step S103, the calculation unit 613 calculates information about similarity using the dark image and the gain image stored in the image storage unit 612 and the data transmitted to the image capturing control apparatus 601 in step S102. Based on the calculated information about similarity, a radiation image capturing apparatus that has generated a significant image is identified.

In step S104, the communication unit 622 transmits the radiation image from the radiation image capturing apparatus identified in step S103 to the image capturing control apparatus 601, and the image acquisition unit 611 acquires the transmitted radiation image.

Based on the above-described processing, the image capturing control apparatus 601 does not have to acquire all the radiation images from each of the radiation image capturing apparatuses, and can select a significant radiation image using the image capturing information having a smaller data size than that of the radiation image.

Figure 9:
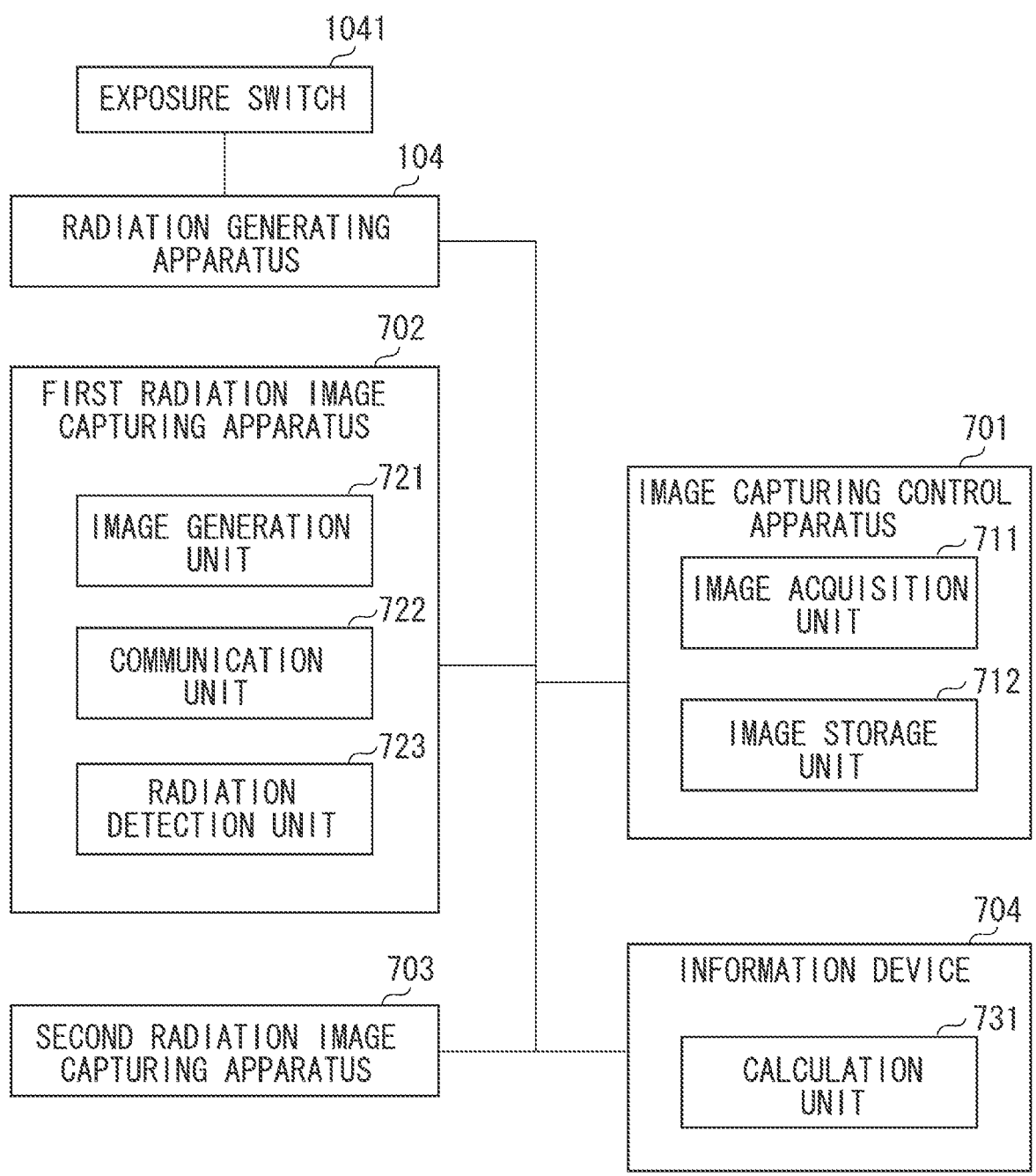
FIG. 9 is a block diagram illustrating a radiation image capturing system according to a fourth exemplary embodiment.

In a radiation image capturing system according to a fourth exemplary embodiment illustrated in FIG. 9, an information device calculates information about similarity instead of each of radiation image capturing apparatuses or an image capturing control apparatus.

Each of radiation image capturing apparatuses 702 and 703 of the fourth exemplary embodiment includes an image generation unit 721, a communication unit 722, and a radiation detection unit 723. The image generation unit 721 is similar to the image generation unit 111 of the first exemplary embodiment, and the communication unit 722 is similar to the communication unit 622 of the third exemplary embodiment. The radiation detection unit 723 is similar to the radiation detection unit 115 of the first exemplary embodiment. An image capturing control apparatus 701 includes an image acquisition unit 711 and an image storage unit 712.

An information device 704 includes a calculation unit 731. The calculation unit 731 is similar to the calculation unit 613 of the third exemplary embodiment.

An operational flow is similar to that of the first exemplary embodiment (FIG. 3).

In step S101, each of the radiation image capturing apparatuses transmits a dark image and a gain image acquired in advance to the image capturing control apparatus 701 to store the dark image and the gain image in the image storage unit 712. The dark image and the gain image are respectively acquired by dark image capturing and gain image capturing performed in advance by each of the radiation image capturing apparatuses.

In step S102, each of the radiation image capturing apparatuses captures an image of an object, and the communication unit 722 transmits data having a smaller size than image data and including a characteristic of the image data as image capturing information to the image capturing control apparatus 701.

In step S103, the dark image and the gain image stored in the image storage unit 712 and the data transmitted to the image capturing control apparatus 701 in step S102 are transmitted to the information device 704, and the calculation unit 731 calculates information about similarity. The calculation unit 731 transmits the calculated information about similarity to the image capturing control apparatus 701, and the image acquisition unit 711 identifies a radiation image capturing apparatus that has generated a significant image.

In step S104, the communication unit 722 transmits the radiation image from the radiation image capturing apparatus identified in step S103 to the image capturing control apparatus 701, and the image acquisition unit 711 acquires the transmitted radiation image.

The above-description has referenced a case in which the image capturing information created by each of the radiation image capturing apparatuses is transmitted to the image capturing control apparatus 701, and the image capturing control apparatus 701 transmits the received image capturing information to the information device 704. However, the image capturing information can be directly transmitted from each of the image capturing apparatuses to the information device 704.

Based on the above-described processing, the image capturing control apparatus 701 does not have to acquire all the radiation images from each of the radiation image capturing apparatuses, and can select a significant radiation image using the image capturing information having a smaller data size than that of the radiation image.

Each of the exemplary embodiments has been described in detail. However, the present disclosure is not limited to the discussed exemplary embodiments and may also include various embodiments within the scope of the present disclosure. Each of the above-described exemplary embodiments are merely examples, and other embodiments easily conceivable from the above-described exemplary embodiments are also included in the present disclosure.

According to each of the exemplary embodiments, accuracy in selecting a significant radiation image from images captured by a plurality of radiation image capturing apparatuses that capture images can be improved.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-152484, filed Aug. 7, 2017, which is hereby incorporated by reference herein in its entirety.

What is claimed is:

1. A radiation image capturing system comprising:
a plurality of radiation image capturing apparatuses each configured to perform an image capturing operation to capture a radiation image based on radiation emitted from a radiation generating apparatus and transmitted through an object, the plurality of radiation image capturing apparatuses each including a plurality of pixels arranged in a two-dimensional array, a drive circuit configured to drive the plurality of pixels, and an image storage unit configured to store the radiation image based on the signal read from the plurality of pixels driven by the drive unit;
a control apparatus configured to communicate with the plurality of radiation image capturing apparatuses;
a calculation unit configured to calculate information about similarity between the radiation image and a reference image; and
an image acquisition unit configured to acquire a radiation image from a radiation image capturing apparatus selected from the plurality of radiation image capturing apparatuses based on the information about similarity.

2. The radiation image capturing system according to claim 1,
wherein each of the plurality of radiation image capturing apparatuses includes the calculation unit, and
wherein the control apparatus includes the image acquisition unit.

3. The radiation image capturing system according to claim 1,
wherein each of the plurality of radiation image capturing apparatuses includes a communication unit configured to transmit image capturing information having a smaller data size than that of the radiation image, and
wherein the control apparatus includes the image acquisition unit, and the calculation unit configured to calculate the information about similarity between the reference image and the radiation image using the image capturing information acquired from each of the plurality of radiation image capturing apparatuses.

4. The radiation image capturing system according to claim 1,
wherein the calculation unit is provided separately from the plurality of radiation image capturing apparatuses and the control apparatus and is configured to calculate the information about similarity for each of the plurality of radiation image capturing apparatuses, and
wherein the control apparatus includes the image acquisition unit.

5. The radiation image capturing system according to claim 1, wherein the reference image is an image captured by an image capturing operation not based on the radiation transmitted through the object.

6. The radiation image capturing system according to claim 5, wherein the reference image is at least one of an image captured by an image capturing operation performed without emission of the radiation and an image captured by an image capturing operation performed with emission of radiation not having been transmitted through the object.

7. The radiation image capturing system according to claim 6, wherein the calculation unit is configured to calculate the information about similarity based on the radiation image and the image captured by the image capturing operation performed without the emission of the radiation.

8. The radiation image capturing system according to claim 6, wherein the calculation unit is configured to calculate the information about similarity based on the radiation image and the image captured by the image capturing operation performed with the emission of the radiation not having been transmitted through the object.

9. The radiation image capturing system according to claim 1, wherein the calculation unit is configured to calculate the information about similarity using a statistic of each image.

10. The radiation image capturing system according to claim 9, wherein the calculation unit is configured to calculate the information about similarity using an approximation expression of a histogram of each of the images.

11. The radiation image capturing system according to claim 1, wherein the calculation unit is configured to calculate the information about similarity based on learning performed in advance.

12. The radiation image capturing system according to claim 11, wherein the calculation unit includes a neural network.

13. A radiation image capturing system comprising:
a plurality of radiation image capturing apparatuses each configured to perform an image capturing operation to capture a radiation image based on radiation emitted from a radiation generating apparatus and transmitted through an object, the plurality of radiation image capturing apparatuses each including a plurality of pixels arranged in a two-dimensional array, and the radiation image being based on a signal read from the plurality of pixels;
a control apparatus configured to communicate with the plurality of radiation image capturing apparatuses;
a calculation unit configured to calculate information about similarity between the radiation image and a reference image; and
an image acquisition unit configured to acquire a radiation image from a radiation image capturing apparatus selected from the plurality of radiation image capturing apparatuses based on the information about similarity,
wherein each of the plurality of radiation image capturing apparatuses includes the calculation unit, and
wherein the control apparatus includes the image acquisition unit.

14. A radiation image capturing system comprising:
a plurality of radiation image capturing apparatuses each configured to perform an image capturing operation to capture a radiation image based on radiation emitted from a radiation generating apparatus and transmitted through an object, the plurality of radiation image capturing apparatuses each including a plurality of pixels arranged in a two-dimensional array, and the radiation image being based on a signal read from the plurality of pixels;
a control apparatus configured to communicate with the plurality of radiation image capturing apparatuses;
a calculation unit configured to calculate information about similarity between the radiation image and a reference image, wherein the calculation unit is provided separately from the plurality of radiation image capturing apparatuses and the control apparatus and is configured to calculate the information about similarity for each of the plurality of radiation image capturing apparatuses; and
an image acquisition unit configured to acquire a radiation image from a radiation image capturing apparatus selected from the plurality of radiation image capturing apparatuses based on the information about similarity,
wherein the control apparatus includes the image acquisition unit.

* * * * *